June 2, 1925.

J. E. CHEEK ET AL 1,540,601

COMBINED FAN PULLEY AND CRANK SHAFT ADJUSTER

Filed March 19, 1923

WITNESSES

INVENTORS

Patented June 2, 1925.

1,540,601

UNITED STATES PATENT OFFICE.

JOHN E. CHEEK AND REGINALD W. KENT, OF WICHITA FALLS, TEXAS.

COMBINED FAN PULLEY AND CRANK-SHAFT ADJUSTER.

Application filed March 19, 1923. Serial No. 626,227.

*To all whom it may concern:*

Be it known that we, JOHN E. CHEEK and REGINALD W. KENT, citizens of the United States, residing at Wichita Falls, in the county of Wichita and State of Texas, have invented a new and useful Combined Fan Pulley and Crank-Shaft Adjuster, of which the following is a specification.

The object of this invention is to provide a device of this nature to be used in connection with automobile engines. The same is mounted on the front end of the engine crank shaft and pinned thereto for the purpose of eliminating the end play of said crank shaft.

Another object of the invention is to provide a device of this character that can be adjusted to take up the wear when necessary.

Another object of the invention is to provide a device of this nature that is very simple and practical and can be manufactured and sold at a very nominal cost.

The nature and advantages of the invention will be better understood when the following detail description is read in connection with the accompanying drawing forming a part of this application. The invention resides in the construction, combination and arrangement of parts as claimed.

Figure 1:
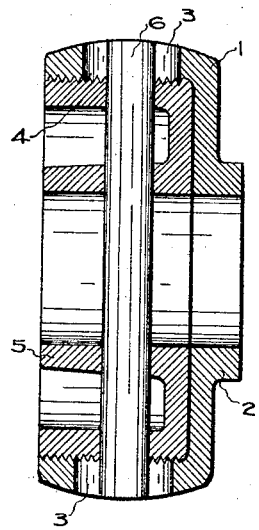
Figure 2:
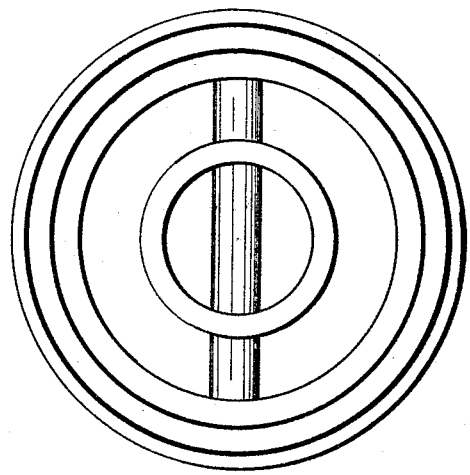
Figure 3:
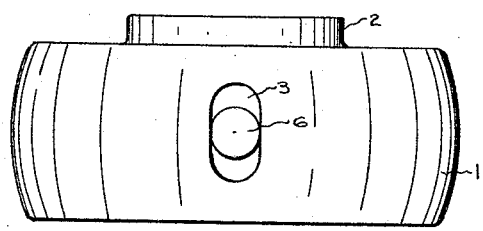

In the accompanying drawing the various parts will be referred to by numbers. And, wherein, Figure 1 is a sectional view.
Figure 2 is a side plan view.
Figure 3 is a top plan view.

The subject matter of this invention comprises a cylindrical pulley 1. The crank shaft bearing hub 2 is supported with a solid surface of metal, forming a part of the cylindrical pulley 1, on one side thereof, the hub 2 having a raised end bearing surface to provide a clearance between the pulley 1 and the engine crank case. The pulley 1 is provided with oppositely disposed longitudinal apertures as shown at 3. The pulley 1 is interiorly threaded to engage the peripheral threads of the cylindrical member 4. A member including a cylindrical bushing 4 is threaded into the cylindrical pulley 1. The hub 5 is supported with a solid surface of metal forming a part of the cylindrical member on one side thereof. The hub 5 and the cylindrical bushing 4 are provided with apertures disposed transversely therethrough. 6 is a pin of suitable design arranged to fit tightly in the apertures of the cylindrical bushing 4 and the hub 5. The longitudinal apertures 3 in the pulley 1 permit adjusting movement of the bushing 4 and to allow reinsertion of the pin 6 when the apertures in the bushing are alined with said longitudinal apertures at any point therealong. This device is provided to replace the usual fan pulley.

The installation of the device is accomplished by mounting the member including the bushing 4 on the forward end of the crank shaft at which time the pulley 1 is threaded over the bushing so as to permit the hub 2 to be adjacent the cylinder block. When the proper adjustment is obtained and the apertures of the bushing alined with the longitudinal apertures 3, the pin 6 is inserted therethrough, thus preventing longitudinal movement of either member on the crank shaft.

While it is believed from the foregoing description the nature and advantages of the invention will be readily apparent, we desire to have it understood that we do not limit ourselves to what is herein shown and described, and that such changes may be resorted to, when desired, as fall within the scope of what is herein claimed.

What we claim is:

An adjusting device for crank shafts comprising a centrally apertured cylindrical pulley having an internally threaded flange thereon, said flange being provided with oppositely disposed elongated slots in its periphery; a hub projection on one side of said cylindrical pulley surrounding said central aperture; a centrally apertured annularly grooved bushing threaded into said cylindrical pulley having alined apertures through its diameter, and a pin extended diametrically through the slots and apertures of each of the members to lock the same in relative positions, one on the other.

JOHN E. CHEEK.
REGINALD W. KENT.

Witnesses:
C. B. TONEY, Jr.,
FRED. L. GARONSON.